United States Patent [19]
Yamazaki et al.

[11] Patent Number: 5,432,278
[45] Date of Patent: Jul. 11, 1995

[54] PROCESS FOR PRODUCING CRYSTALLINE OXYTITANIUM PHTHALOCYANINE

[75] Inventors: Itaru Yamazaki, Kawasaki; Hideyuki Takai; Hajime Miyazaki, both of Yokohama; Tetsuro Kanemaru, Tokyo; Kazushi Iuchi, Yokohama, all of Japan

[73] Assignee: Canon Kabushiki Kaisha, Tokyo, Japan

[21] Appl. No.: 113,367

[22] Filed: Aug. 30, 1993

Related U.S. Application Data

[63] Continuation of Ser. No. 780,781, Oct. 23, 1991, abandoned.

[30] Foreign Application Priority Data

Oct. 24, 1990 [JP] Japan .................. 2-287563

[51] Int. Cl.⁶ ............................................ C09B 67/50
[52] U.S. Cl. .................................... 540/141; 540/140
[58] Field of Search ............................... 540/140, 141

[56] References Cited

U.S. PATENT DOCUMENTS

| | | | |
|---|---|---|---|
| 4,444,861 | 4/1984 | Nogami et al. | 430/58 |
| 4,664,997 | 5/1987 | Suzuki et al. | 430/58 |
| 4,728,592 | 3/1988 | Ohaku et al. | 430/59 |
| 4,814,441 | 3/1989 | Hauser et al. | 540/122 |
| 5,106,536 | 4/1992 | Miyamoto et al. | 540/140 |
| 5,132,197 | 7/1992 | Iuchi et al. | 430/76 |
| 5,166,339 | 11/1992 | Duff et al. | 540/140 |

FOREIGN PATENT DOCUMENTS

| | | |
|---|---|---|
| 0269079 | 6/1988 | European Pat. Off. . |
| 0384470 | 8/1990 | European Pat. Off. . |
| 0399430 | 11/1990 | European Pat. Off. . |
| 0409737 | 1/1991 | European Pat. Off. . |
| 59-49544 | 3/1984 | Japan . |
| 59-166959 | 9/1984 | Japan . |
| 61-239248 | 10/1986 | Japan . |
| 62-67094 | 3/1987 | Japan . |
| 63-364 | 1/1988 | Japan . |
| 63-365 | 1/1988 | Japan . |
| 63-366 | 1/1988 | Japan . |
| 63-37163 | 2/1988 | Japan . |
| 63-57670 | 3/1988 | Japan . |
| 63-80263 | 4/1988 | Japan . |
| 63-116158 | 5/1988 | Japan . |
| 63-198067 | 8/1988 | Japan . |
| 64-17066 | 1/1989 | Japan . |
| 3-128973 | 5/1991 | Japan . |

*Primary Examiner*—John M. Ford
*Assistant Examiner*—Pavanaram K. Sripada
*Attorney, Agent, or Firm*—Fitzpatrick, Cella, Harper & Scinto

[57] ABSTRACT

A process for producing crystalline oxytitanium phthalocyanine showing strong peaks in CuKα characteristic X-ray diffraction at Bragg angles $2\theta \pm 0.2°$ of 9.0°, 14.2°, 23.9°, and 27.1°, which comprises a dispersion treatment of the aqueous paste of oxytitanium phthalocyanine in an ether type compound.

7 Claims, 7 Drawing Sheets

PROCESS FOR PRODUCING CRYSTALLINE OXYTITANIUM PHTHALOCYANINE

This application is a continuation of application Ser. No. 07/780,781 filed Oct. 23, 1991, now abandoned.

BACKGROUND OF THE INVENTION

1. Field of the Invention

The present invention relates to a process for producing crystalline oxytitanium phthalocyanine. More particularly, the present invention relates to a process for producing crystalline oxytitanium phthalocyanine of Type-I, which shows strong peaks in CuKα characteristic X-ray diffraction at Bragg angles $2\theta \pm 0.2°$ of 9.0°, 14.2°, 23.9°, and 27.1°.

2. Related Background Art

Phthalocyanine pigments have recently been extensively employed as catalysts, electronic materials such as electrophotographic sensitive members, solar batteries, and sensors, as well as in conventional use in coloration of paints, inks, resins, and the like.

Various crystal structures of oxytitanium phthalocyanines are produced depending on the minute difference of production conditions as described, for example, in Japanese Laid-Open Patent Application Nos. 59-49544 (U.S. Pat. No. 4,444,861), 59-166959, 61-239248 (U.S. Pat. No. 4,728,592), 62-67094 (U.S. Pat. No. 4,664,997), 63-366, 63-116158, 63-198067, and 64-17066. The crystalline forms described in the above patent publications, however, are usually obtained as a mixture, which makes it difficult to maintain the standard quality of the products. Accordingly, a method has been desired which gives a pure crystal form of oxytitanium phthalocyanine. Many attempts have been made therefor. Processes for steady production of the A-type or C-type crystal are proposed, for example, in Japanese Laid-Open Patent Application Nos. 63-364, 63-365, 63-37163, 63-57670, and 63-80263.

Japanese Laid-Open Patent Application No. 3-128973 discloses crystalline oxytitanium phthalocyanine having strong peaks at Bragg angles $2\theta \pm 0.2°$ of 9.0°, 14.2°, 23.9°, and 27.1° in CuKα characteristic X-ray diffraction, namely I-type oxytitanium phthalocyanine, and a process for production thereof. However, there is still a need to produce a crystal having higher purity by using a simpler process.

When crystalline oxytitanium phthalocyanine is used as an electric charge-generating substance, the electrophotographic properties of the resulting photosensitive member may delicately vary depending on production conditions.

SUMMARY OF THE INVENTION

The present invention intends to provide a simpler process for producing I-type oxytitanium phthalocyanine.

The present invention provides a process for producing crystalline oxytitanium phthalocyanine showing strong peaks in CuKα characteristic X-ray diffraction at Bragg angles $2\theta \pm 0.2°$ of 9.0°, 14.2°, 23.9°, and 27.1°, the process comprising a dispersion treatment of the oxytitanium phthalocyanine in a dispersion system of an aqueous paste of the oxytitanium phthalocyanine mixed with an ether type compound.

DETAILED DESCRIPTION OF THE PREFERRED EMBODIMENTS

The present invention relates to a process for producing I-type oxytitanium phthalocyanine through dispersion treatment of a mixture of aqueous paste of oxytitanium phthalocyanine and an ether type compound.

Oxytitanium phthalocyanine produced in the present invention has the structure represented by the formula below:

wherein; each $X_1$, $X_2$, $X_3$, and $X_4$ denotes Cl or Br, and each n, m, l, and k denotes a number of from 0 to 4.

The aqueous paste of oxytitanium phthalocyanine used in the present invention is preferably prepared by a conventional acid-pasting method. This aqueous paste contains water uniformly. The preferred solid content is within the range of 15% to 45% by weight. The crystalline form of oxytitanium phthalocyanine used in the aqueous paste is not specifically limited. The oxytitanium phthalocyanine can be in various crystal forms, that is, amorphous to entirely amorphous, depending on the conditions of the acid-pasting treatment such as the amount of sulfuric acid, the amount of water, and the treating temperature. In the present invention, oxytitanium phthalocyanine in the aqueous paste may be in any of amorphous forms, slightly amorphous crystal forms or their mixture, provided that the oxytitanium phthalocyanine has been subjected to an acid-pasting treatment.

The ether type compound employed in the present invention includes dimethyl ether, diethyl ether, n-propyl ether, n-butyl ether, isobutyl ether, t-butyl ether, n-amyl ether, n-butyl methyl ether, n-butyl ethyl ether, tetrahydrofuran, dioxane, 1,2-dimethoxyethane and 1,2-diethoxyethane. One or more of the ether compounds are selected therefrom, and used singly or in combination of two or more thereof. Among these, use of a highly water miscible solvent, such as tetrahydrofuran, dioxane, 1,2-dimethoxyethane, and 1,2-diethoxyethane, is preferable since the resulting crystals can be easily recovered without adhesion to the vessel. Tetrahydrofuran is particularly preferable.

When tetrahydrofuran is used as an ether solvent, I-type crystalline oxytitanium phthalocyanine which gives an electrophotographic photosensitive member having especially superior electrophotographic properties can be provided by adjusting the amount of the water in the dispersion system in the range of from 5 to 20% by weight based on the total weight of the water and the tetrahydrofuran in the system.

Figure 4:
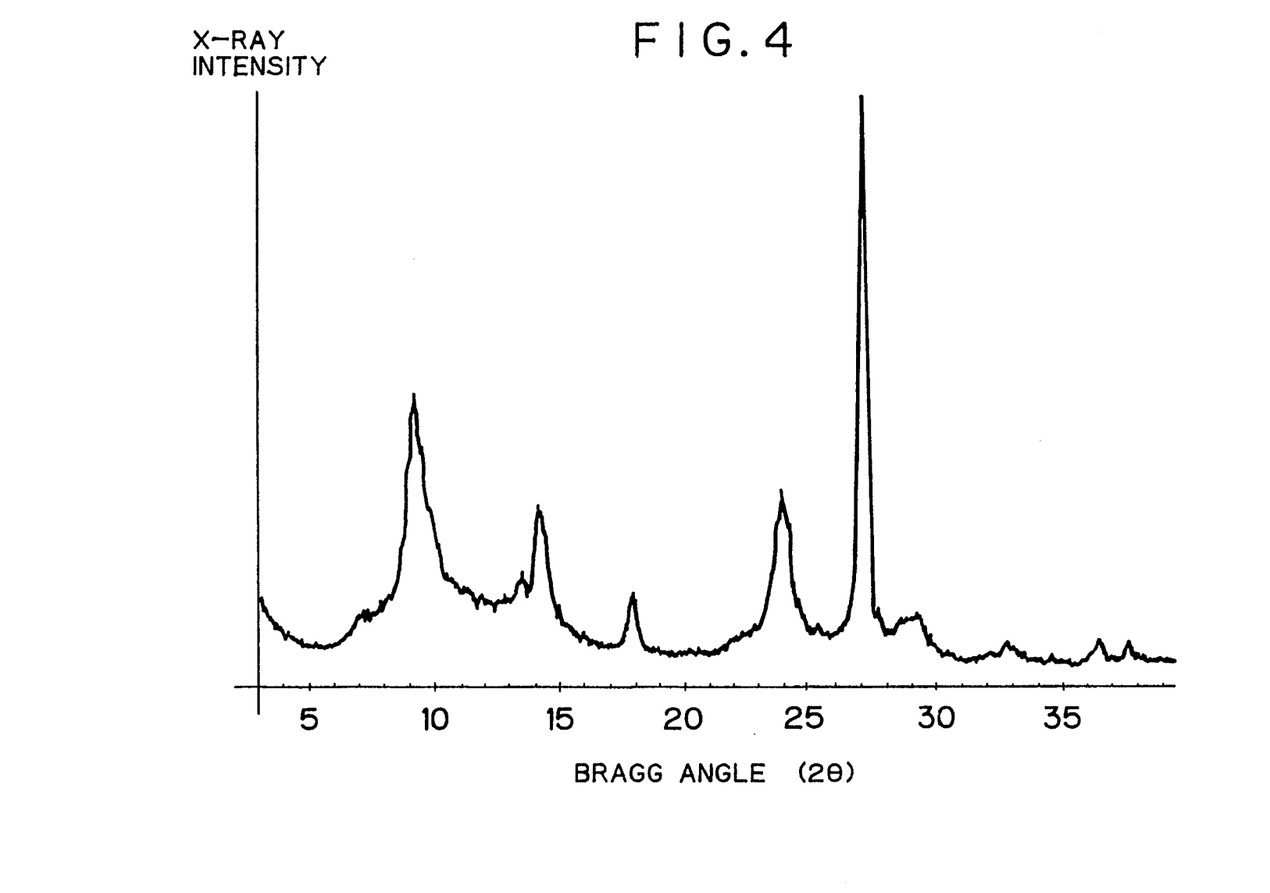
FIG. 4 shows a CuKα characteristic X-ray diffraction pattern of the I-type oxytitanium phthalocyanine crystal obtained in Example 1.

In the present invention, I-type crystalline oxytitanium phthalocyanine is prepared, for example, by dispersing the aforementioned aqueous paste of oxytitanium phthalocyanine in an ether compound with a dispersion medium, such as glass beads, steel beads, and alumina beads, using a milling apparatus such as a paint shaker, a sand mill, or a ball mill for one or more hours, preferably for 5 to 30 hours. An example of the X-ray diffraction pattern is shown in FIG. 4.

The amount of the ether type compound employed in the dispersion treatment may be optionally selected, but is preferably in the range of from about 5 to about 40 times (by weight) that of the oxytitanium phthalocyanine. The use of an insufficient amount of the solvent causes a higher viscosity of the treated fluid, which tends to render the uniform treatment difficult, while the use of a surplus amount of the solvent leads to the reduction of productivity by lowering the amount to be treated per unit volume.

The milling treatment for dispersion may be conducted either at room temperature or under heating.

The present invention is described more specifically by reference to the Examples and Comparative Examples.

EXAMPLE 1

Figure 1:
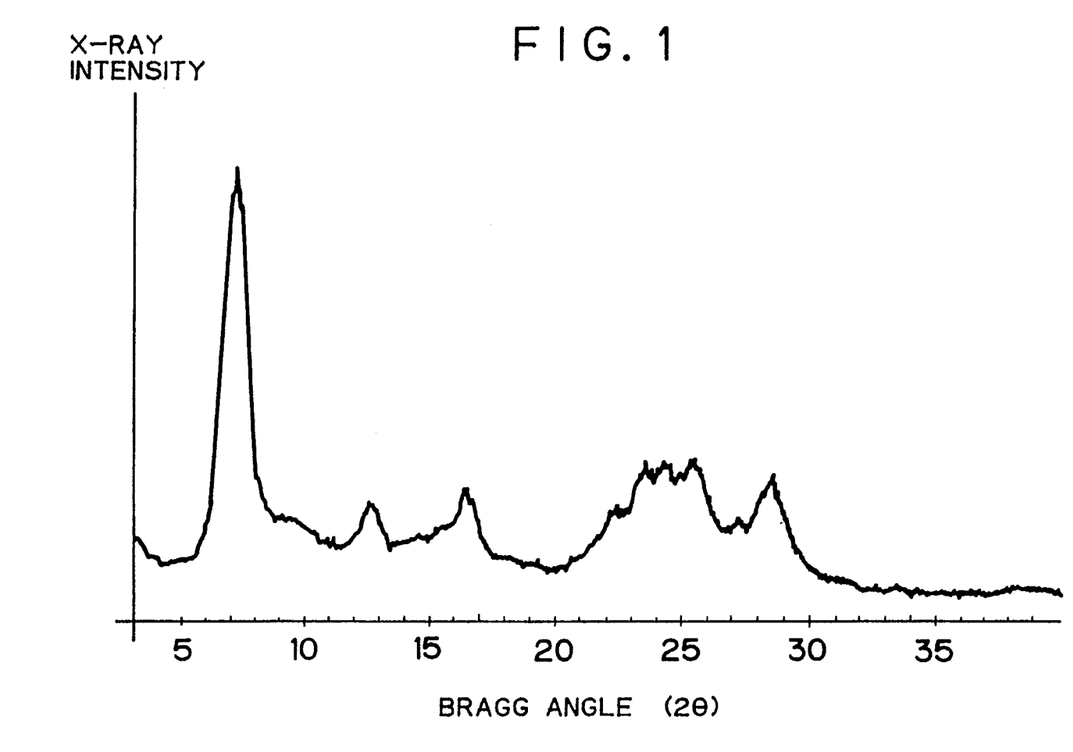
FIG. 1 shows a CuKα characteristic X-ray diffraction pattern of a dried matter of Aqueous paste (1).
Figure 5:
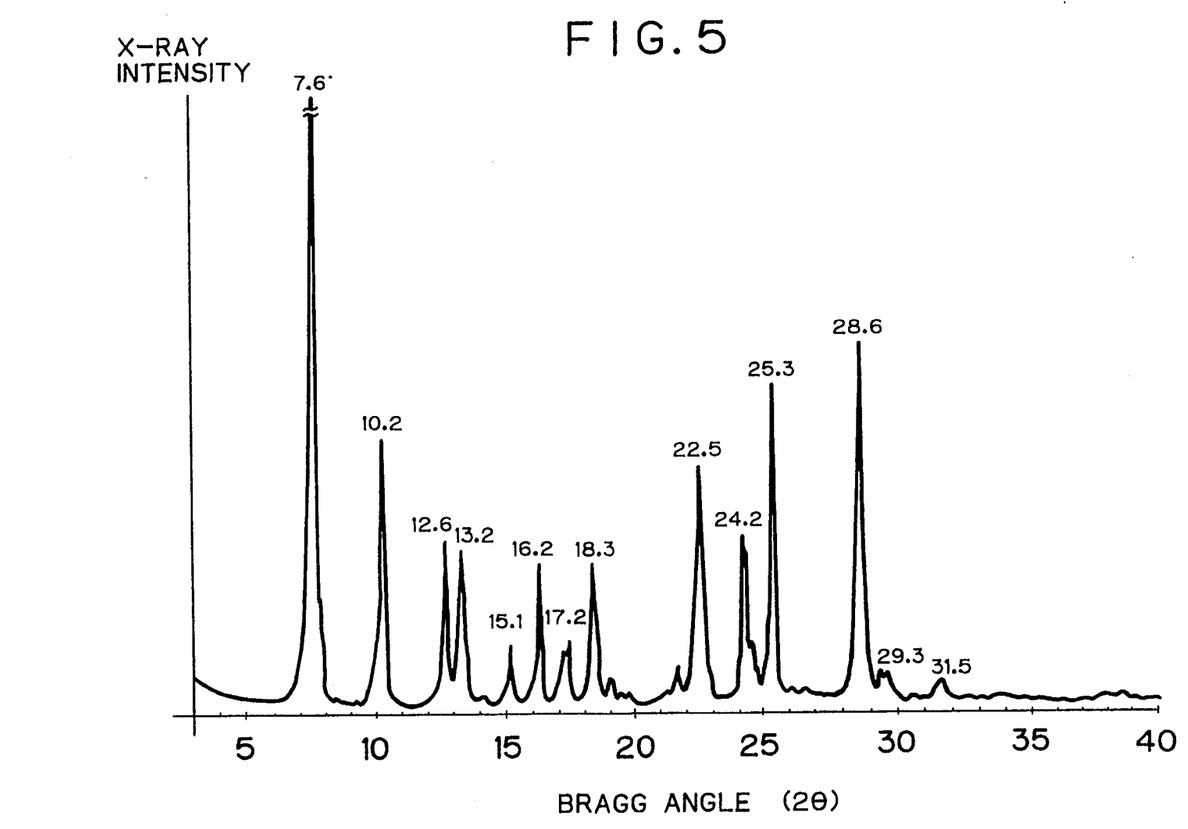
FIG. 5 shows a CuKα characteristic X-ray diffraction pattern of the B-type oxytitanium phthalocyanine crystal used in Examples and Comparative Examples.

Crystalline oxytitanium phthalocyanine, generally called type B, was prepared according to the production example disclosed in Japanese Laid-Open Patent Application No. 61-239248 (U.S. Pat. No. 4,728,592). FIG. 5 shows the CuKα characteristic X-ray diffraction pattern of the resulting crystalline oxytitanium phthalocyanine. Two parts (hereinafter "parts" being based on weight) of this B-type crystals was gradually added into 60 parts of concentrated sulfuric acid at a temperature not higher than 5° C., and was dissolved therein. The solution was added dropwise to 600 parts of ice water in 30 minutes. The pigment formed was collected by filtration, and washed sufficiently with water to obtain an aqueous paste of oxytitanium phthalocyanine (hereinafter referred to as "Aqueous paste (1)"). The solid content in the aqueous paste was 20% by weight. A portion of this aqueous paste was dried and subjected to CuKα characteristic X-ray diffraction measurement. FIG. 1 shows the result.

To 5 parts of Aqueous paste (1), 20 parts of tetrahydrofuran was added, and the mixture was subjected to milling treatment with glass beads of 1 mm diameter at 20° C. for 20 hours. The solid matter was collected from this dispersion, and dried to give crystalline oxytitanium phthalocyanine.

The result is shown in Table 1. The CuKα characteristic X-ray diffraction pattern of the resulting crystalline oxytitanium phthalocyanine is shown in FIG. 4.

EXAMPLES 2–10

Crystalline oxytitanium phthalocyanine was obtained in the same manner as in Example 1 except that the treating compound, the treating time, and the treating temperature were changed as shown in Table 1. The results are shown in Table 1.

EXAMPLE 11

Figure 2:
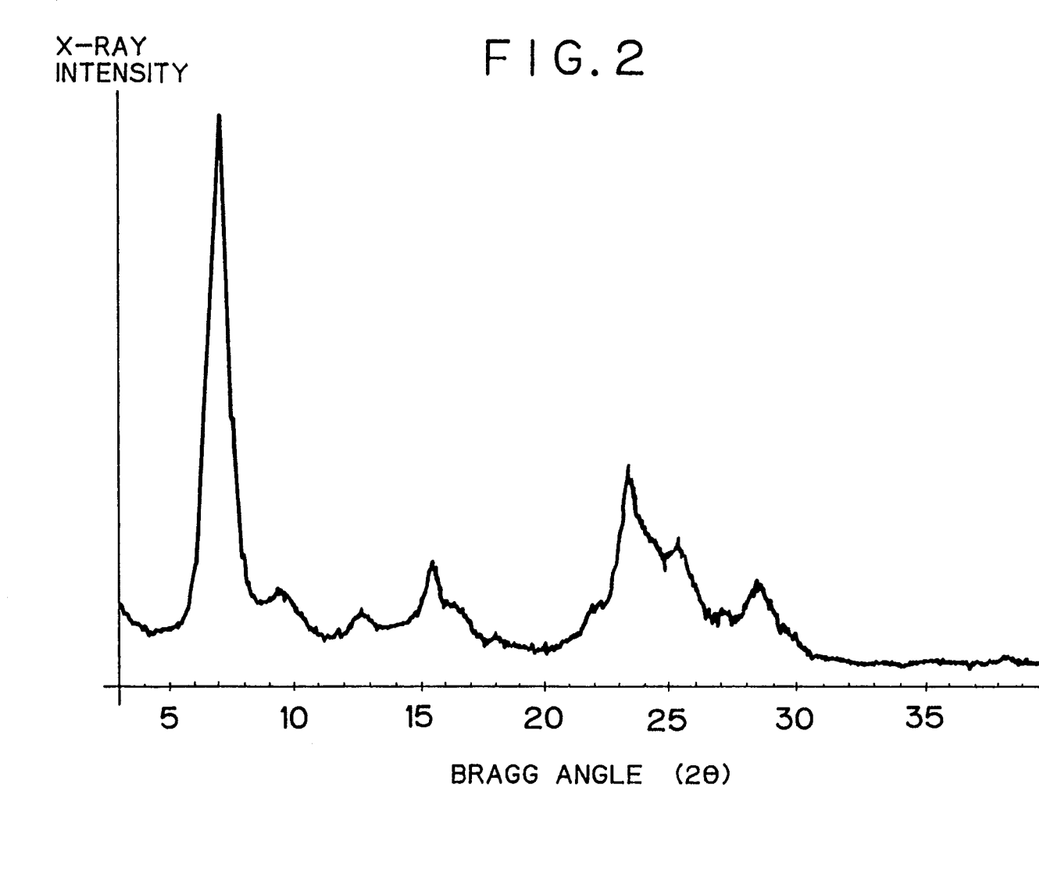
FIG. 2 shows a CuKα characteristic X-ray diffraction pattern of a dried matter of Aqueous paste (2).

Two parts of the B-type oxytitanium phthalocyanine employed in Example 1 was gradually added to 60 parts of concentrated sulfuric acid at a temperature of not higher than 5° C., and was dissolved therein. The solution was added dropwise into 800 parts of water at 25° C. for 15 minutes. The pigment formed was collected by filtration, and washed sufficiently with water, to obtain an aqueous paste of oxytitanium phthalocyanine (hereinafter referred to as "Aqueous paste (2)"). The solid content in the aqueous paste was 24% by weight A portion of this aqueous paste was dried and subjected to CuKα characteristic X-ray diffraction measurement. The result is shown in FIG. 2.

To 4.2 parts of Aqueous paste (2), 20 parts of tetrahydrofuran was added, and the mixture was subjected to milling treatment with glass beads of 1 mm diameter at 20° C. for 20 hours. The solid matter was collected from this dispersion, and dried to give crystalline oxytitanium phthalocyanine.

The result is shown in Table 2.

EXAMPLES 12–21

Crystalline oxytitanium phthalocyanine was obtained in the same manner as in Example 11 except that the treating compound, the treating time, and the treating temperature were changed as shown in Table 2. The results are shown in Table 2.

EXAMPLE 22

Figure 6:
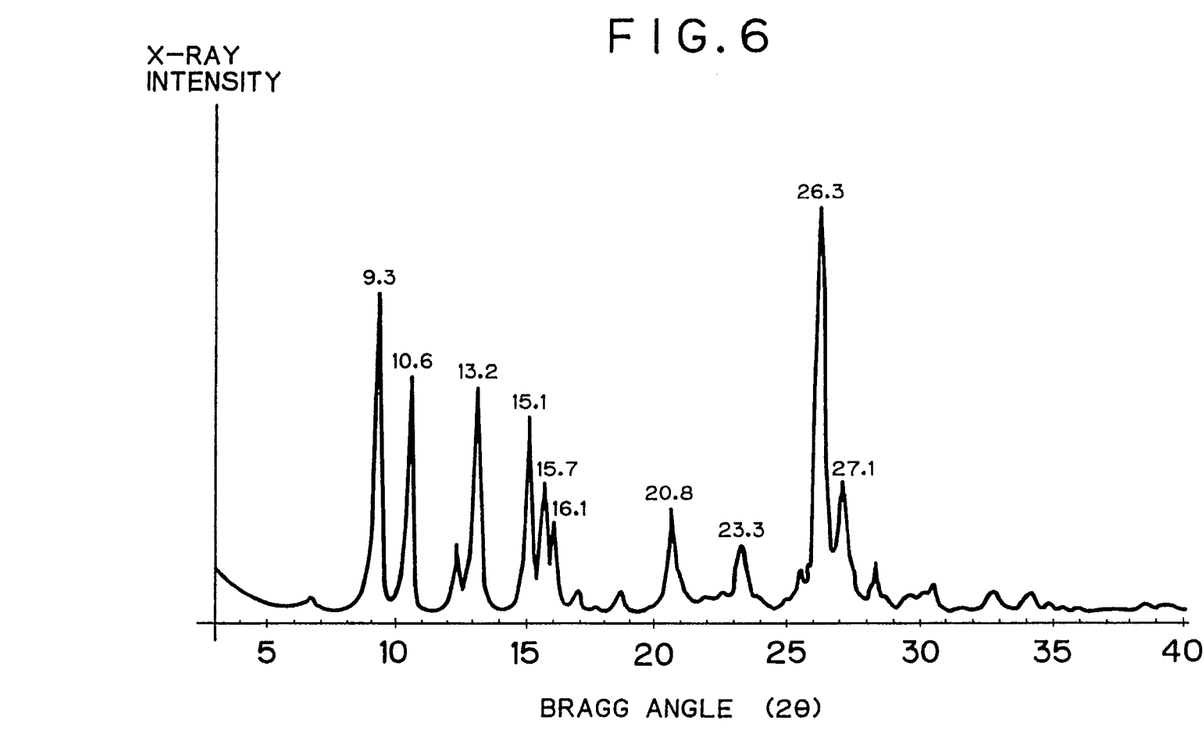
FIG. 6 shows a CuKα characteristic X-ray diffraction pattern of the A-type oxytitanium phthalocyanine crystal used in Examples and Comparative Examples.

A-type crystalline oxytitanium phthalocyanine was prepared according to the production example disclosed in Japanese Laid-Open Patent Application No. 62-67094 (U.S. Pat. No. 4,664,997). FIG. 6 shows the CuKα characteristic X-ray diffraction pattern of the resulting crystalline oxytitanium phthalocyanine. Two parts of this A-type crystalline matter was gradually added into 80 parts of concentrated sulfuric acid at a temperature not higher than 30° C., and was dissolved therein. The solution was added dropwise to 800 parts of water at a temperature not higher than 30° C. for 10 minutes. The pigment formed was collected by filtration, and washed sufficiently with water to obtain an aqueous paste of oxytitanium phthalocyanine (hereinafter referred to as "Aqueous paste (3)"). The solid content in the aqueous paste was 22% by weight.

Figure 3:
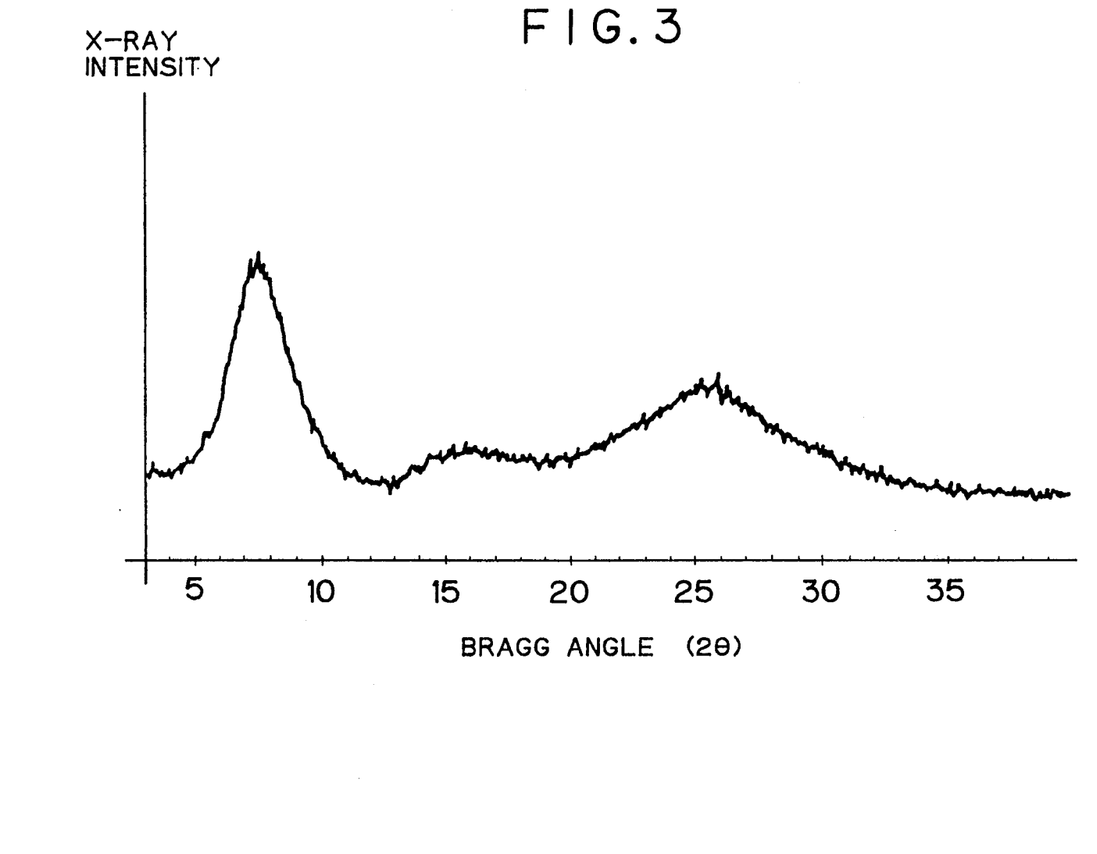
FIG. 3 shows a CuKα characteristic X-ray diffraction pattern of a dried matter of Aqueous paste (4).

A portion of this aqueous paste was dried and subjected to CuKα characteristic X-ray diffraction measurement. The result is shown in FIG. 3.

To 4.5 parts of Aqueous paste (3), 20 parts of tetrahydrofuran was added, and the mixture was subjected to milling treatment with glass beads of 1 mm diameter at 20 ° C. for 20 hours. The solid matter was collected from this dispersion, and dried to give crystalline oxytitanium phthalocyanine.

The result is shown in Table 3.

EXAMPLES 23–32

Crystalline oxytitanium phthalocyanine was prepared in the same manner as in Example 22 except that the treating compound, the treating time, and the treating temperature were changed as shown in Table 3. The results are shown in Table 3.

Comparative Examples 1–12

Crystalline oxytitanium phthalocyanine was prepared in the same manner as in Example 1 except that the employed oxytitanium phthalocyanine, the treating compound, the treating time, and the treating temperature were changed as shown in Table 4.

The results are shown in Table 4.

The B-type and A-type oxytitanium phthalocyanine were prepared respectively in the same manner as in Example 1 and Example 22.

Comparative Examples 13–21

Crystalline oxytitanium phthalocyanine was prepared in the same manner as in Example 1 except that the employed oxytitanium phthalocyanine, the treating compound, the treating time, and the treating temperature were changed as shown in Table 5.

The results are shown in Table 5.

Comparative Examples 22–33

Crystalline oxytitanium phthalocyanine was prepared in the same manner as in Example 1 except that the employed oxytitanium phthalocyanine, the treating compound, the treating time, and the treating temperature were changed as shown in Table 6.

The results are shown in Table 6.

Figure 7:
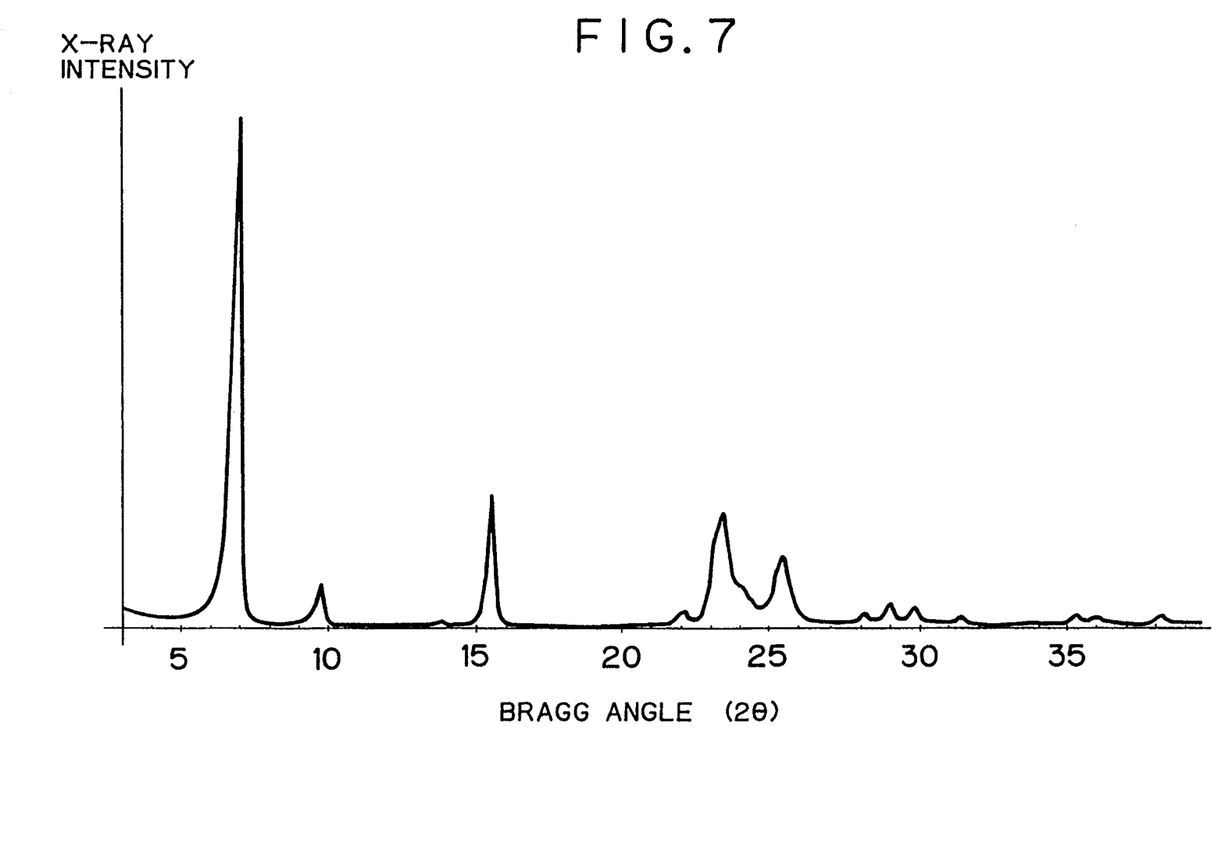
FIG. 7 shows a CuKα characteristic X-ray diffraction pattern of the C-type oxytitanium phthalocyanine crystal obtained in Comparative Examples.

The CuKα characteristic X-ray diffraction pattern of the C-type crystal of the obtained crystalline oxytitanium phthalocyanine is shown in FIG. 7.

EXAMPLE 33

To 5 parts of Aqueous paste (1) used in Experiment 1, 21 parts of tetrahydrofuran was added to make the water ratio 16% by weight based on the total weight of water and tetrahydrofuran in the dispersion system (hereinafter referred to simply as "water ratio"). The mixture was subjected to milling treatment with glass beads of 1 mm diameter at 20° C. for 20 hours. The solid matter was collected from this dispersion, and dried to give crystalline oxytitanium phthalocyanine.

The result is shown in Table 7.

EXAMPLES 34–39

Oxytitanium phthalocyanine was prepared in the same manner as in Example 33 except that the solid content and the water ratio in Aqueous paste (1) were changed as shown in Table 7.

The results are shown in Table 7.

EXAMPLE 40

Crystalline oxytitanium phthalocyanine was prepared in the same manner as in Example 33 except that Aqueous paste (2) in Example 11 was used in place of Aqueous paste (1).

The result is shown in Table 8.

EXAMPLES 41–46

Crystalline oxytitanium phthalocyanine was prepared in the same manner as in Example 40 except that the solid content and the water ratio in Aqueous paste (2) were changed as shown in Table 8.

The results are shown in Table 8.

EXAMPLE 47

Crystalline oxytitanium phthalocyanine was prepared in the same manner as in Example 33 except that Aqueous paste (3) in Example 22 was used in place of Aqueous paste (1) and tetrahydrofuran was used in an amount of 19 parts.

The result was shown in Table 9.

EXAMPLES 48–53

Crystalline oxytitanium phthalocyanine was prepared in the same manner as in Example 47 except that the solid content and the water ratio in Aqueous paste (3) were changed as shown in Table 9.

The results are shown in Table 9.

Experimental Example 1

A paint for an electroconductive layer was prepared by dispersing 50 parts of powdery titanium oxide coated with tin oxide containing 10% antimony oxide, 25 parts of a cresol type phenol resin, 20 parts of 2-methoxyethanol, 5 parts of methanol, and 0.002 part of silicone oil (a polydimethylsiloxanepolyoxyalkylene copolymer, having a number average molecular weight of 3,000) with glass beads of 1 mm diameter for 2 hours by means of a sand mill.

The above paint was applied on an aluminum cylinder (30 mm in diameter, 260 mm in length) by a dip coating, and dried at 140° C. for 30 minutes to form an electroconductive layer of 20 μm thick.

Thereon, a solution of 5 parts of a 6-66-610-12 quaternary polyamide copolymer resin (weight average molecular weight: 25,000) dissolved in 70 parts of methanol and 25 parts of butanol was applied by dipping, and dried to form a subbing layer of 1 μm thick.

Separately, 4 parts of crystalline oxytitanium phthalocyanine prepared in Example 33 and 2 parts of a polyvinylbutyral resin (weight average molecular weight: 22,000, butyralation degree: 63 mol %) were dispersed in 100 parts of cyclohexanone with glass beads of 1 mm diameter by means of a sand mill for 3 hours. The dispersion was diluted with 100 parts of methyl ethyl ketone. This diluted dispersion was applied on the aforementioned subbing layer, and was dried at 110° C. for 10 minutes to form a charge-generating layer of 0.15 μm thick.

Subsequently, a solution prepared by dissolving 10 parts of the charge-transporting substance represented by the structural formula below:

and 10 parts of a bisphenol-Z-type polycarbonate resin (number-average molecular weight: 20,000) in 60 parts of monochlorobenzene was applied on the above charge-generating layer by a dip coating, and dried at 110° C. for one hour to form a charge-transporting layer of 20 μm thick. Thus an electrophotographic photosensitive member was prepared.

This electrophotographic photosensitive member was installed on a laser beam printer (Trade name: LBP-SX, made by Canon). This electrophotographic photosensitive member was charged to have a dark area potential of $-700$ V, and was exposed to the laser beam light of wavelength of 778 nm. The exposure required to reduce the potential from $-700$ V to $-200$ V, the sensitivity of the photosensitive member, was measured to be 0.22 $\mu J/cm^2$. Further, the electrophotographic photosensitive member was charged to have a dark area potential of $-700$ V, and was exposed to the laser beam light of 778 nm at an exposure of 2.8 $\mu J/cm^2$ and the residual potential was measured to be $-50$ V.

imental Example 1 except that the crystalline oxytitanium phthalocyanine obtained in Examples 34-53 were used in place of the crystalline oxytitanium phthalocyanine of Example 33.

The results are shown in Table 10.

EXAMPLES 54-62

Crystalline oxytitanium phthalocyanine was prepared in the same manner as in Example 33 (Aqueous paste (1)), Example 40 (Aqueous paste (2)), and Example 47 (Aqueous paste (3)) except that the water ratio was as shown in Table 11.

The results are shown in Table 11.

Experimental Examples 22-30

Electrophotographic photosensitive members were prepared and evaluated in the same manner as in Experimental example 1 except that crystalline oxytitanium phthalocyanine obtained in Examples 54-62 were used in place of the crystalline oxytitanium phthalocyanine of Example 33.

The results are shown in Table 12.

As described above, the present invention enables the production of I-type crystalline oxytitanium phthalocyanine in a quite simple manner.

Further, as shown in Tables 10 and 12, the electrophotographic photosensitive member employing the I-type crystalline oxytitanium phthalocyanine of the present invention exhibits especially excellent electrophotographic properties when the oxytitanium phthalocyanine was prepared with the water ratio in the range of from 5% to 20% by weight based on the total of the water and tetrahydrofuran in the dispersion system.

TABLE 1

| Example No. | Oxytitanium phthalocyanine used | Treating compound | Treating temperature (°C.) | Treating time (hours) | Resulting crystal form |
| --- | --- | --- | --- | --- | --- |
| 1 | Aqueous paste (1) | Tetrahydrofuran | 20 | 20 | Type I |
| 2 | Aqueous paste (1) | 1,2-dimethoxyethane | 20 | 20 | Type I |
| 3 | Aqueous paste (1) | Dioxane | 20 | 20 | Type I |
| 4 | Aqueous paste (1) | Tetrahydrofuran | 50 | 15 | Type I |
| 5 | Aqueous paste (1) | Dioxane | 50 | 15 | Type I |
| 6 | Aqueous paste (1) | 1,2-dimethoxyethane | 70 | 10 | Type I |
| 7 | Aqueous paste (1) | Dimethyl ether | 50 | 15 | Type I |
| 8 | Aqueous paste (1) | n-Propyl ether | 50 | 20 | Type I |
| 9 | Aqueous paste (1) | n-Butyl ether | 20 | 20 | Type I |
| 10 | Aqueous paste (1) | Isobutyl ether | 20 | 20 | Type I |

Experimental Examples 2-21

Electrophotographic photosensitive members were prepared and evaluated in the same manner as in Exper-

TABLE 2

| Example No. | Oxytitanium phthalocyanine used | Treating compound | Treating temperature (°C.) | Treating time (hours) | Resulting crystal form |
| --- | --- | --- | --- | --- | --- |
| 11 | Aqueous paste (2) | Tetrahydrofuran | 20 | 20 | Type I |
| 12 | Aqueous paste (2) | 1,2-dimethoxyethane | 20 | 20 | Type I |
| 13 | Aqueous paste (2) | Dioxane | 20 | 20 | Type I |
| 14 | Aqueous paste (2) | Tetrahydrofuran | 50 | 15 | Type I |
| 15 | Aqueous paste (2) | 1,2-dimethoxyethane | 50 | 15 | Type I |
| 16 | Aqueous paste (2) | Dioxane | 70 | 10 | Type I |
| 17 | Aqueous paste (2) | Dimethyl ether | 20 | 20 | Type I |
| 18 | Aqueous paste (2) | n-Propyl ether | 20 | 20 | Type I |
| 19 | Aqueous paste (2) | Isobutyl ether | 50 | 15 | Type I |
| 20 | Aqueous paste (2) | n-Butyl ether | 50 | 20 | Type I |
| 21 | Aqueous paste (2) | n-Amyl ether | 20 | 20 | Type I |

TABLE 3

| Example No. | Oxytitanium phthalocyanine used | Treating compound | Treating temperature (°C.) | Treating time (hours) | Resulting crystal form |
|---|---|---|---|---|---|
| 22 | Aqueous paste (3) | Tetrahydrofuran | 20 | 20 | Type I |
| 23 | Aqueous paste (3) | 1,2-diethoxyethane | 20 | 20 | Type I |
| 24 | Aqueous paste (3) | Dioxane | 20 | 20 | Type 1 |
| 25 | Aqueous paste (3) | Tetrahydrofuran | 50 | 15 | Type I |
| 26 | Aqueous paste (3) | 1,2-dimethoxyethane | 50 | 15 | Type I |
| 27 | Aqueous paste (3) | Dioxane | 70 | 10 | Type I |
| 28 | Aqueous paste (3) | Diethyl ether | 20 | 20 | Type I |
| 29 | Aqueous paste (3) | n-Propyl ether | 20 | 20 | Type I |
| 30 | Aqueous paste (3) | 1,2-diethoxyethane | 20 | 20 | Type I |
| 31 | Aqueous paste (3) | n-Butyl ether | 50 | 15 | Type I |
| 32 | Aqueous paste (3) | n-Amyl ether | 50 | 15 | Type I |

TABLE 4

| Comparative example No. | Oxytitanium phthalocyanine used | Treating compound | Treating temperature (°C.) | Treating time (hours) | Resulting crystal form |
|---|---|---|---|---|---|
| 1 | Type B | Tetrahydrofuran | 20 | 20 | Type A |
| 2 | Type B | 1,2-dimethoxyethane | 20 | 20 | Type A |
| 3 | Type B | Dioxane | 20 | 20 | Type A |
| 4 | Type B | Dimethyl ether | 20 | 20 | Type A |
| 5 | Type B | n-Butyl ether | 20 | 20 | Type A |
| 6 | Type B | Isobutyl ether | 20 | 20 | Type A |
| 7 | Type A | Tetrahydrofuran | 20 | 20 | Type A |
| 8 | Type A | 1,2-dimethoxyethane | 20 | 20 | Type A |
| 9 | Type A | Dioxane | 20 | 20 | Type A |
| 10 | Type A | Dimethyl ether | 20 | 20 | Type A |
| 11 | Type A | n-Butyl ether | 20 | 20 | Type A |
| 12 | Type A | Isobutyl ether | 20 | 20 | Type A |

TABLE 5

| Comparative example No. | Oxytitanium phthalocyanine used | Treating compound | Treating temperature (°C.) | Treating time (hours) | Resulting crystal form |
|---|---|---|---|---|---|
| 13 | Dried Aqueous paste (1) | Tetrahydrofuran | 20 | 20 | Type A |
| 14 | Dried Aqueous paste (1) | 1,2-dimethoxyethane | 20 | 20 | Type A |
| 15 | Dried Aqueous paste (1) | Dioxane | 20 | 20 | Type A |
| 16 | Dried Aqueous paste (1) | Tetrahydrofuran | 60 | 15 | Type A |
| 17 | Dried Aqueous paste (1) | 1,2-dimethoxyethane | 60 | 15 | Type A |
| 18 | Dried Aqueous paste (1) | Dioxane | 60 | 15 | Type A |
| 19 | Dried Aqueous paste (1) | Dimethyl ether | 20 | 20 | Type A |
| 20 | Dried Aqueous paste (1) | n-Butyl ether | 20 | 20 | Type A |
| 21 | Dried Aqueous paste (1) | Isobutyl ether | 20 | 20 | Type A |

TABLE 6

| Comparative example No. | Oxytitanium phthalocyanine used | Treating compound | Treating temperature (°C.) | Treating time (hours) | Resulting crystal form |
|---|---|---|---|---|---|
| 22 | Aqueous paste (1) | Methanol | 20 | 20 | Type C |
| 23 | Aqueous paste (1) | Ethanol | 20 | 20 | Type C |
| 24 | Aqueous paste (1) | Isopropyl alcohol | 20 | 20 | Type C |
| 25 | Aqueous paste (1) | Dimethylformamide | 20 | 20 | Type B |
| 26 | Aqueous paste (2) | Methanol | 20 | 20 | Type C |
| 27 | Aqueous paste (2) | Ethanol | 20 | 20 | Type C |
| 28 | Aqueous paste (2) | Isopropyl alcohol | 20 | 20 | Type C |
| 29 | Aqueous paste (2) | Dimethylformamide | 20 | 20 | Type B |
| 30 | Aqueous paste (3) | Methanol | 30 | 20 | Type C |
| 31 | Aqueous paste (3) | Ethanol | 30 | 20 | Type C |
| 32 | Aqueous paste (3) | Isopropyl alcohol | 20 | 20 | Type C |
| 33 | Aqueous paste (3) | Dimethylformamide | 30 | 20 | Type B |

TABLE 7

| Example No. | Oxytitanium phthalocyanine used | Solid content in Aqueous paste (% by weight) | Water ratio (% by weight) | Resulting crystal form |
| --- | --- | --- | --- | --- |
| 33 | Aqueous paste (1) | 20 | 16 | Type I |
| 34 | Aqueous paste (1) | 20 | 20 | Type I |
| 35 | Aqueous paste (1) | 20 | 5 | Type I |
| 36 | Aqueous paste (1) | 15 | 20 | Type I |
| 37 | Aqueous paste (1) | 15 | 5 | Type I |
| 38 | Aqueous paste (1) | 30 | 20 | Type I |
| 39 | Aqueous paste (1) | 30 | 5 | Type I |

TABLE 8

| Example No. | Oxytitanium phthalocyanine used | Solid content in Aqueous paste (% by weight) | Water ratio (% by weight) | Resulting crystal form |
| --- | --- | --- | --- | --- |
| 40 | Aqueous paste (2) | 24 | 16 | Type I |
| 41 | Aqueous paste (2) | 24 | 20 | Type I |
| 42 | Aqueous paste (2) | 24 | 5 | Type I |
| 43 | Aqueous paste (2) | 15 | 20 | Type I |
| 44 | Aqueous paste (2) | 15 | 5 | Type I |
| 45 | Aqueous paste (2) | 30 | 20 | Type I |
| 46 | Aqueous paste (2) | 30 | 5 | Type I |

TABLE 9

| Example No. | Oxytitanium phthalocyanine used | Solid content in Aqueous paste (% by weight) | Water ratio (% by weight) | Resulting crystal form |
| --- | --- | --- | --- | --- |
| 47 | Aqueous paste (3) | 22 | 17 | Type I |
| 48 | Aqueous paste (3) | 22 | 20 | Type I |
| 49 | Aqueous paste (3) | 22 | 5 | Type I |
| 50 | Aqueous paste (3) | 15 | 20 | Type I |
| 51 | Aqueous paste (3) | 15 | 5 | Type I |
| 52 | Aqueous paste (3) | 30 | 20 | Type I |
| 53 | Aqueous paste (3) | 30 | 5 | Type I |

TABLE 10

| Experimental example No. | Example No. for preparation of oxytitanium phthalocyanine | Sensitivity ($\mu J/cm^2$) | Residual potential ($-V$) |
| --- | --- | --- | --- |
| 1 | 33 | 0.22 | 50 |
| 2 | 34 | 0.21 | 50 |
| 3 | 35 | 0.22 | 55 |
| 4 | 36 | 0.21 | 50 |
| 5 | 37 | 0.22 | 45 |
| 6 | 38 | 0.22 | 55 |
| 7 | 39 | 0.22 | 50 |
| 8 | 40 | 0.20 | 40 |
| 9 | 41 | 0.21 | 45 |
| 10 | 42 | 0.21 | 45 |
| 11 | 43 | 0.21 | 50 |
| 12 | 44 | 0.22 | 50 |
| 13 | 45 | 0.22 | 50 |
| 14 | 46 | 0.22 | 55 |
| 15 | 47 | 0.21 | 45 |
| 16 | 48 | 0.22 | 50 |
| 17 | 49 | 0.22 | 50 |
| 18 | 50 | 0.22 | 50 |
| 19 | 51 | 0.22 | 50 |
| 20 | 52 | 0.22 | 50 |
| 21 | 53 | 0.21 | 45 |

TABLE 11

| Example No. | Oxytitanium phthalocyanine used | Solid content in Aqueous paste (% by weight) | Water ratio (% by weight) | Resulting crystal form |
| --- | --- | --- | --- | --- |
| 54 | Aqueous paste (1) | 20 | 25 | Type I |
| 55 | Aqueous paste (1) | 20 | 40 | Type I |
| 56 | Aqueous paste (1) | 20 | 3 | Type I |
| 57 | Aqueous paste (2) | 24 | 25 | Type I |
| 58 | Aqueous paste (2) | 24 | 40 | Type I |
| 59 | Aqueous paste (2) | 24 | 3 | Type I |
| 60 | Aqueous paste (3) | 22 | 25 | Type I |
| 61 | Aqueous paste (3) | 22 | 40 | Type I |
| 62 | Aqueous paste (3) | 22 | 3 | Type I |

TABLE 12

| Experimental example No. | Example No. for preparation of oxytitanium phthalocyanine | Sensitivity ($\mu J/cm^2$) | Residual potential ($-V$) |
| --- | --- | --- | --- |
| 22 | 54 | 0.56 | 100 |
| 23 | 55 | 0.64 | 220 |
| 24 | 56 | 0.60 | 200 |
| 25 | 57 | 0.58 | 180 |
| 26 | 58 | 0.66 | 250 |
| 27 | 59 | 0.62 | 220 |
| 28 | 60 | 0.58 | 200 |
| 29 | 61 | 0.66 | 260 |
| 30 | 62 | 0.64 | 230 |

What is claimed is:

1. A process for producing I-type crystalline oxytitanium phthalocyanine showing strong peaks in CuKα characteristic X-ray diffraction at Bragg angles $2\theta \pm 0.2°$ of 9.0°, 14.2°, 23.9° and 27.1°, the highest peak being at 27.1°, comprising a process of converting oxytitanium phthalocyanine to the I-type crystalline oxytitanium phthalocyanine, said converting process consisting essentially of the following steps:

1. preparation of aqueous paste by acid pasting treatment of the oxytitanium phthalocyanine using an inorganic acid, followed by;
   2. dispersion treatment of the oxytitanium phthalocyanine to mill in a dispersion system composed of a mixture of an aqueous paste of the oxytitanium phthalocyanine and a solvent selected from the group consisting of tetrahydrofuran, dioxane, 1,2-dimethoxyethane and 1,2-diethoxyethane, wherein the solid content in the aqueous paste is in the range of from 15% to 45% based on the total weight of the aqueous paste.

2. A process according to claim 1, wherein the solvent in the dispersion system is tetrahydrofuran.

3. A process according to claim 1, wherein the water ratio in the dispersion system is in the range of from 5% to 20% by weight based on the total weight of water and solvent in the dispersion system.

4. A process according to claim 1, wherein the ratio of the oxytitanium phthalocyanine to the solvent in the dispersion system is in the range of from 1:5 to 1:40 by weight.

5. A process according to claim 3, wherein the solvent is tetrahydrofuran and the water ratio in the dispersion system is in the range of from 5–20% by weight based on the total weight of water and tetrahydrofuran in the dispersion system.

6. A process according to claim 1, wherein said inorganic acid is sulfuric acid.

7. A process according to claim 5, wherein said inorganic acid is sulfuric acid.

* * * * *

UNITED STATES PATENT AND TRADEMARK OFFICE
CERTIFICATE OF CORRECTION

PATENT NO. : 5,432,278
DATED : July 11, 1995
INVENTOR(S) : ITARU YAMAZAKI, ET AL.

It is certified that error appears in the above-identified patent and that said Letters Patent is hereby corrected as shown below:

COLUMN 1

Line 33, "standard" should read --standard of--.

COLUMN 2

Line 8, "paste (4)." should read --paste (3).--.

COLUMN 4

Line 26, "weight A" should read --weight.  A--.

COLUMN 6

Line 17, "was" should read --is--.
   Line 35, "polydimethylsiloxanepolyoxyalkylene" should read --polydimethylsiloxane-polyoxyalkylene--.

Signed and Sealed this

Fourteenth Day of November, 1995

Attest:

BRUCE LEHMAN

Attesting Officer    Commissioner of Patents and Trademarks